United States Patent Office 2,941,879
Patented June 21, 1960

2,941,879

METHOD OF KILLING GRASS

Lyle D. Goodhue, Bartlesville, Okla., assignor to Phillips Petroleum Company, a corporation of Delaware No Drawing. Filed Feb. 24, 1956, Ser. No. 567,479

5 Claims. (Cl. 71—2.7)

This invention relates to the control of grass growth, especially to the control of growth of Bermuda grass. In one of its aspects this invention relates to the application of a dithiocarbamate to a grass to control its growth. In another aspect of the invention it relates to the elimination of a grass, for example Bermuda grass, from a place at which it is or may be present by applying to said place a dithiocarbamate, as set forth and described herein.

Bermuda grass is, of course, a highly desirable plant. However, it is well known that Bermuda grass is undesirable in certain locations. For example, Bermuda grass found in fields of growing plants of nutritional or commercial value, such as corn etc., is clearly undesirable. This is so primarily because this grass robs the plants of water, fertilizer, and even sunshine. Large sums of money are spent each year to eradicate Bermuda and other grasses growing among and between rows of planted crops. Bermuda grass is also undesirable in certain flower beds, decorative borders and the like.

I have now discovered that dithiocarbamates having the following characteristic structure are effective as Bermuda and other grass control agents or herbicides.

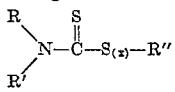

In the above formula R and R' can be one of an alkyl, aryl, cycloalkyl, alkaryl and aralkyl radicals containing from 1–10 carbon atoms, inclusive. R and R' can be such as to form a heterocyclic ring with the nitrogen. R" in the formula can be one of an alkyl, aryl, cycloalkyl, alkaryl and an aralkyl radical containing from 1–10 carbon atoms, inclusive; $x$ is an integer included in the range 1–3, inclusive. The radicals can be substituted with certain groups such as halogen, hydroxy, etc. However, unsubstituted radicals are preferred at the present time. It will be noted that the heterocyclic ring can contain atoms other than the nitrogen, as evident from consideration of the specific compounds disclosed herein. The characteristic structure of the compounds of the invention is, of course, as stated and is responsible for the effectiveness thereof.

It is an object of this invention to provide a control for growth of grasses, for example Bermuda grass. It is another object of this invention to eradicate Bermuda and other grasses from certain locations in which these grow undesirably. It is a further object of this invention to provide compounds or compositions suitable for use in a herbicidal method, especially applicable to the control of Bermuda grass.

Other aspects, objects and the several advantages of the invention are apparent from a consideration of this disclosure and the appended claims.

Some examples of compounds of the above general formula are: N,N-dimethyl-S-ethylsulfenyl dithiocarbamate, N,N-dipentyl-S-isooctylthiosulfenyl dithiocarbamate, N,N-di-n-butyl-S-n-decyl dithiocarbamate, N,N-di-n-decyl-S-t-hexylsulfenyl dithiocarbamate, N,N-diphenyl-S-methyl-thiosulfenyl dithiocarbamate, N,N-ditolyl-S-[2,-4,6-trimethylbenzyl] dithiocarbamate, N,N-di-[2,4-diethyiphenyl]-S-cyclohexylsulfenyl dithiocarbamate, N,N-di-[2-ethyl-4-propylcyclohexyl]-S-phenylthiosulfenyl dithiocarbamate, N,N-di-n-propyl-S-tert-butylthiosulfenyl dithiocarbamate, N,N-diethyl-S-tert-butylthiosulfenyl dithiocarbamate, N,N-dimethyl-S-tert-butylthiosulfenyl dithiocarbamate, N,N-dimethyl-S-methylsulfenyl dithiocarbamate, N,N-dimethyl-S-n-butylsulfenyl dithiocarbamate, N,N-dimethyl-S-isopropylsulfenyl dithiocarbamate, N,N-dimethyl-S-n-propylsulfenyl dithiocarbamate, N,N-diisopropyl-S-n-butyl dithiocarbamate, N,N-[3-oxapentamethylene]-S-tert-butyl-thiosulfenyl dithiocarbamate, N,N-pentamethylene-S-tert-butylsulfenyl dithiocarbamate, N,-N-pentamethylene-S-tert-butylthiosulfenyl dithiocarbamate, N-methyl-N-ethyl-S-ethylsulfenyl-dithiocarbamate, N-tert-butyl-N-isopropyl-S-tert-butylthiosulfenyl dithiocarbamate, N,N-di-[chloro-tert-butyl]-S-tert-butyl dithiocarbamate, N,N-di[chlorophenyl]-S-sec-hexyl dithiocarbamate, N,N-di[hydroxylpropyl]-S-ethylsulfenyl dithiocarbamate, and N,N-di[6-bromodecyl]-S-isopropyl dithiocarbamate.

The herbicides of this invention can be used in conjunction with any suitable carrier or solvent which does not have a harmful effect on the herbicidal properties of these dithiocarbamate compounds. The compounds of the invention can be applied to an area at which the grass already exists or they can be applied so that they will be there to kill or control the growth of grass yet ungrown. The percentage of active ingredient (herbicide) in these solutions can be in the range of 0.1 percent to 5 percent by weight, preferably between 0.5 percent and 2 percent. Examples of suitable solvents or carriers include straight chain, branched chain and cyclic paraffinic hydrocarbons containing at least 5 carbon atoms such as n-pentane, cyclohexane, octane, and the like. A now particularly preferred solvent is HF heavy alkylate, which is an isoparaffinic hydrocarbon having an approximate boiling range of 260° to 800° F. HF is the accepted formula for hydrofluoric acid, well known as a catalyst for alkylation of hydrocarbons. This adjuvant carrier enhances the toxicity of the active ingredient. The herbicides of this invention are effective in the range of 10 to 200 pounds of herbicide per acre of Bermuda grass. Also the herbicides of the invention can be used in combination with other materials if desired. Depending on the area, amounts outside the stated range are applicable.

Different dithiocarbamates of the general formula shown above have different effects on seeds of plants. Therein lies a major advantage of the Bermuda grass herbicides of this invention. After a crop is planted, one of the dithiocarbamates of this invention can be selected which does not substantially adversely affect the planted seeds and applied to the Bermuda grass or other grass growing in the field. The Bermuda grass will be killed and the planted crop will sprout undamaged and will be able to achieve its maximum growth because the growing plants will not be robbed of water, fertilizer, and sunshine by the Bermuda grass. The labor that would be required to weed out the Bermuda grass is thus eliminated.

It is known that Bermuda grass is one of the hardest, if not the hardest, grass to control. Therefore, the invention is exemplified therewith.

EXAMPLE I

Various dithiocarbamates were tested for herbicidal activity toward Bermuda grass in the following manner. The compound to be tested was dissolved in HF heavy alkylate to form a solution containing 1 percent by weight of the dithiocarbamate compound. If the compound to be tested was insoluble in the heavy alkylate, a small amount of acetone was used to dissolve the dithiocarbamate. The heavy alkylate is not toxic to Bermuda grass but does enhance the toxicity of a chemical. Ten milliliters of the 1 percent solution of dithiocarbamate compound were then applied to healthy plugs of Bermuda grass each growing in 4-inch clay flower pots. This corresponds to 100 pounds per acre of the herbicide. The plugs had been growing for two weeks to a month before they were used. The treated plugs were then checked at 3 days, one week, two weeks and 3 weeks. The results of these tests are expressed below in Table I.

It will be noted from the following Table that HF alkylate does not, per se, have a herbicidal effect. The foregoing statement is in no way intended to detract from the excellent properties which HF alkylates have been found to possess with respect to spreading powers and, generally, with respect to enhancement of results obtained when it is used as an adjuvant in agricultural chemicals of the nature here described.

water each through the perforated bottom of a one gallon tin pail. Other general watering was necessary from time to time and the humidity was kept as high as possible by light watering in the pans containing the pots. After one week the condition and number of plants in each pot was recorded. No growth is designated as 0, and normal growth is designated as 3. The results of these tests are recorded below in Table II.

Enough seeds were planted of each kind described in Table II to insure that, when no growth was observed, this was not due to seed failure.

*Table II*

| Compound | Beans | Corn | Radishes | Rye Grass | Millet | Cotton |
|---|---|---|---|---|---|---|
| N,N-di-n-propyl-S-tert-butylthiosulfenyl dithiocarbamate | 0 | 3 | 3 | 0 | 1 | 3 |
| N,N-diethyl-S-tert-butylthiosulfenyl dithiocarbamate | 3 | 3 | 3 | 0 | 2 | 0 |
| N,N-dimethyl-S-tert-butylthiosulfenyl dithiocarbamate | 3 | 3 | 3 | 3 | 3 | 2 |
| N,N-dimethyl-S-methylsulfenyl dithiocarbamate | 0 | 3 | 3 | 3 | 3 | 3 |
| N,N-dimethyl-S-n-butylsulfenyl dithiocarbamate | 0 | 3 | 3 | 3 | 3 | 3 |
| N,N-dimethyl-S-ethylsulfenyl dithiocarbamate | 3 | 3 | 3 | 3 | 3 | 3 |
| N,N-dimethyl-S-isopropylsulfenyl dithiocarbamate | 3 | 3 | 3 | 3 | 3 | 1 |
| N,N-dimethyl-S-n-propylsulfenyl dithiocarbamate | 3 | 3 | 3 | 3 | 3 | 3 |
| N,N-(3-oxapentamethylene)-S-tert-butylthiosulfenyl dithiocarbamate | 0 | 2 | 3 | 3 | 3 | 3 |
| N,N-pentamethylene-S-tert-butylsulfenyl dithiocarbamate | 3 | 3 | 0 | 3 | 0 | 3 |
| N,N-diisopropyl-S-n-butyl dithiocarbamate | 2 | 2 | 3 | 0 | 0 | 0 |
| N,N-pentamethylene-S-tert-butylthiosulfenyl dithiocarbamate | 3 | 3 | 2 | 0 | 1 | 1 |

Reasonable variation and modification are possible within the scope of the foregoing disclosure and the appended claims to the invention the essence of which is that dithiocarbamates, as set forth and described, more specifically alkyl sulfenyl and alkyl thiosulfenyl dithiocarbamates, have been found effective to control or to eradicate undesirable Bermuda grass and that selected dithiocarbamates, also as set forth and described, have been found to be useful for said purpose even in planted

*Table I*

| Compound | 3 days | 1 week | 2 weeks | 3 weeks |
|---|---|---|---|---|
| N,N-di-n-propyl-S-tert-butylthiosulfenyl dithiocarbamate | K.T. | K.T. | K.T. | N.G. |
| N,N-diethyl-S-tert-butylthiosulfenyl dithiocarbamate | K.T. | K.T. | K.T. | N.G. |
| N,N-dimethyl-S-tert-butylthiosulfenyl dithiocarbamate | K.T. | K.T. | Sev. | Sl. G. |
| N,N-dimethyl-S-methylsulfenyl dithiocarbamate | K.T. | K.T. | K.T. | N.G. |
| N,N-dimethyl-S-n-butylsulfenyl dithiocarbamate | K.T. | K.T. | Sev. | Sl. G. |
| N,N-dimethyl-S-ethylsulfenyl dithiocarbamate | K.T. | K.T. | K.T. | N.G. |
| N,N-dimethyl-S-isopropylsulfenyl dithiocarbamate | K.T. | K.T. | K.T. | N.G. |
| N,N-dimethyl-S-n-propylsulfenyl dithiocarbamate | K.T. | K.T. | K.T. | N.G. |
| N,N-(3-oxapentamethylene)-S-tert-butylthiosulfenyl dithiocarbamate | K.T. | K.T. | K.T. | N.G. |
| N,N-pentamethylene-S-tert-butylsulfenyl dithiocarbamate | Sev. | Sev. | Mod. | G.G. |
| N,N-diisopropyl-S-n-butyl dithiocarbamate | Mod. | Mod. | Mod. | Sl. G. |
| N,N-pentamethylene-S-tert-butylthiosulfenyl dithiocarbamate | K.T. | Sev. | Sev. | Sl. G. |
| HF alkylate—no effect | G.G. | G.G. | G.G. | G.G. |

Legend: K.T.=kill tops. Sev.=severe burn. Sl. G.=slight growth. Mod.=moderate growth. N.G.=no growth. G.G.=good growth.

EXAMPLE II

A series of tests was run to determine the effect of these dithiocarbamate compounds on germinating seeds of various plants. The runs were made in the following manner. Six-inch half pots were partly filled with soil and six kinds of seeds were planted. A metal divider was used to assist in planting the seeds. Beans were planted first, followed by corn, radishes, rye grass, millet and cotton. The surface of the soil in the pot was then sprayed with 0.1 gram of the chemical to be tested, dissolved in 10 ml. of acetone (solution contains approximately 1.25 percent by weight of dithiocarbamate). The pot was rotated on a turntable to obtain an even distribution of the spray. The pots were then given 250 ml. of areas without substantially adversely affecting germination of the planted areas.

I claim:

1. A method of killing grass which comprises applying to the place at which said grass is to be killed a small but effective amount to accomplish said killing of a compound selected from the group consisting of N,N-dimethyl-S-methylsulfenyl dithiocarbamate, N,N-dimethyl-S-ethylsulfenyl dithiocarbamate, N,N-dimethyl-S-isopropylsulfenyl dithiocarbamate, and N,N-dimethyl-S-n-propylsulfenyl dithiocarbamate.

2. A method of killing grass which comprises applying to the place at which said grass is to be killed a small but effective amount to accomplish said killing of N,N-dimethyl-S-methylsulfenyl dithiocarbamate.

3. A method of killing grass which comprises applying to the place at which said grass is to be killed a small but effective amount to accomplish said killing of N,N-dimethyl-S-ethylsulfenyl dithiocarbamate.

4. A method of killing grass which comprises applying to the place at which said grass is to be killed a small but effective amount to accomplish said killing of N,N-dimethyl-S-isopropylsulfenyl dithiocarbamate.

5. A method of killing grass which comprises applying to the place at which said grass is to be killed a small but effective amount to accomplish said killing of N,N-dimethyl-S-n-propylsulfenyl dithiocarbamate.

References Cited in the file of this patent

UNITED STATES PATENTS

| | | |
|---|---|---|
| 1,972,961 | Tisdale et al. | Sept. 11, 1934 |
| 2,166,120 | Bousquet | July 18, 1939 |
| 2,535,877 | Stewart | Dec. 26, 1950 |
| 2,598,989 | Goodhue et al. | June 3, 1952 |
| 2,650,876 | Stewart | Sept. 1, 1953 |
| 2,704,246 | Goodhue et al. | Mar. 15, 1955 |
| 2,744,898 | Harman et al. | May 8, 1956 |

FOREIGN PATENTS

| | | |
|---|---|---|
| 858,352 | Germany | Dec. 4, 1952 |